United States Patent
Farley et al.

(10) Patent No.: US 12,304,839 B2
(45) Date of Patent: May 20, 2025

(54) SYSTEM AND METHOD FOR REMINERALIZING A FLUID

(71) Applicant: Pentair Residential Filtration, LLC, Brookfield, WI (US)

(72) Inventors: Sarah Farley, Minnetonka, MN (US); Robert Orvin Crowder, Lino Lakes, MN (US); Mohan R. Khadilkar, Plymouth, MN (US)

(73) Assignee: Pentair Residential Filtration, LLC, Brookfield, WI (US)

( * ) Notice: Subject to any disclaimer, the term of this patent is extended or adjusted under 35 U.S.C. 154(b) by 654 days.

(21) Appl. No.: 17/061,830

(22) Filed: Oct. 2, 2020

(65) Prior Publication Data

US 2021/0101809 A1    Apr. 8, 2021

Related U.S. Application Data

(60) Provisional application No. 62/910,752, filed on Oct. 4, 2019.

(51) Int. Cl.
| | |
|---|---|
| *C02F 1/68* | (2023.01) |
| *C02F 1/00* | (2023.01) |
| *C04B 9/00* | (2006.01) |
| *C02F 1/44* | (2023.01) |

(Continued)

(52) U.S. Cl.
CPC .............. *C02F 1/688* (2013.01); *C02F 1/001* (2013.01); *C02F 1/008* (2013.01); *C04B 9/00* (2013.01); *C02F 1/441* (2013.01); *C02F 2201/005* (2013.01); *C02F 2209/10* (2013.01);
(Continued)

(58) Field of Classification Search
CPC .......... C02F 1/001; C02F 1/008; C02F 1/441; C02F 1/442; C02F 1/66; C02F 1/68; C02F 1/688; C02F 2201/005; C02F 2209/10; C02F 2209/40; C02F 2209/42; C02F 2307/10; C04B 2111/00284; C04B 2111/00793; C04B 2111/40; C04B 28/32; C04B 38/0051; C04B 9/00
See application file for complete search history.

(56) References Cited

U.S. PATENT DOCUMENTS

| | | | |
|---|---|---|---|
| 2008/0145550 A1 | 6/2008 | Caine et al. | |
| 2011/0100890 A1* | 5/2011 | Brotman | C02F 9/20 |
| | | | 210/202 |
| 2012/0255623 A1 | 10/2012 | Bell et al. | |

(Continued)

FOREIGN PATENT DOCUMENTS

| | | | |
|---|---|---|---|
| CN | 104529204 A | * | 4/2015 |
| JP | 2016155126 A | | 9/2016 |

(Continued)

OTHER PUBLICATIONS

CN-104529204-A; English translation (Year: 2015).*

(Continued)

*Primary Examiner* — Terry K Cecil
(74) *Attorney, Agent, or Firm* — Husch Blackwell LLP

(57) ABSTRACT

A composition capable of setting to produce a cementitious material for use in remineralizing a fluid is provided. The composition includes a first magnesium-containing compound, a second magnesium-containing compound, and water present in the composition in an amount sufficient such that the composition sets to a cementitious material.

20 Claims, 3 Drawing Sheets

(51) Int. Cl.
*C04B 111/00* (2006.01)
*C04B 111/40* (2006.01)

(52) U.S. Cl.
CPC . *C02F 2209/40* (2013.01); *C04B 2111/00284* (2013.01); *C04B 2111/40* (2013.01)

(56) References Cited

U.S. PATENT DOCUMENTS

| 2019/0039922 | A1  | 2/2019 | Nelson et al. | |
|---|---|---|---|---|
| 2019/0127253 | A1* | 5/2019 | Thomas  | E03B 3/28 |
| 2021/0178357 | A1* | 6/2021 | Fischer  | C02F 1/66 |

FOREIGN PATENT DOCUMENTS

| RU | 2616677 C1 | 4/2017 | | |
|---|---|---|---|---|
| WO | WO-2009135113 A1 * | 11/2009 |  | A23L 2/52 |
| WO | 2017038972 A1 | 3/2017 | | |
| WO | 2017134217 A1 | 8/2017 | | |

OTHER PUBLICATIONS

Extended European Search Report, European Application No. 20200167.3, dated Feb. 23, 2021, 11 pages.
Beaudoin J.J. et al: "Strength development in magnesium oxysulfate cement", Cement and Concrete Research., vol. 8, No. 1, Jan. 1, 1978, pp. 103-112.
Wu Chengyou et al: "Water Resistance of Basic Magnesium Sulfate Cement", Matec Web of Conferences, vol. 67, Jan. 1, 2016, p. 07008.
Examination Report issued for European Patent Application No. 20200167.3 dated Sep. 21, 2022, 5 pages.
First Office Action issued by the China National Intellectual Property Administration for Chinese Patent Application No. 202011073014.8 on Jan. 12, 2023, 18 pages.
Summons to attend oral proceedings pursuant to Rule 115(1) EPC for European Patent Application No. 20200167.3 dated Mar. 13, 2024, 2 pages.
Annex to summons to attend oral proceedings pursuant to Rule 115(1) EPC for European Patent Application No. 20200167.3 dated Mar. 13, 2024, 6 pages.

\* cited by examiner

SYSTEM AND METHOD FOR
REMINERALIZING A FLUID

RELATED APPLICATIONS

This application claims priority under 35 U.S.C. § 119 to U.S. Provisional Patent Application No. 62/910,752 filed on Oct. 4, 2019, the entire contents of which are incorporated herein by reference.

BACKGROUND

Reverse osmosis includes filtering liquid by passing the liquid through a semi-permeable membrane having pores large enough for solvent to pass, but small enough to retain the passage of solute contaminant. By pressurizing the liquid above its osmotic pressure, the solvent liquid molecules will diffuse across the membrane but the solute molecules will remain. The resulting brine is then discarded and the filtered solvent is retained. Such reverse-osmosis systems can be configured to produce purified water from virtually any source.

While this is advantageous for many reasons and in many applications, it is nonetheless imperfect for the production of drinking water or other beverage water, such as for tea, coffee, soda, hot chocolate, or flavored water. Specifically, the reverse-osmosis process is not selective. That is, reverse osmosis removes all dissolved mineral ions, both those which are desirable for health and taste along with those which are not. Maintaining an appropriate amount of minerals in drinking water is considered beneficial for human health, e.g., standards set forth by World Health Organization ("Nutrients in Drinking Water", 2005). The flavor of water may also be improved by maintaining levels of dissolved minerals and alkalinity, as well as the flavor of food and beverages created using water. In particular, the Specialty Coffee Association recommends at least 50 ppm hardness $CaCO_3$ and at least 40 ppm alkalinity as $CaCO_3$ for optimal water from a sensory perspective (Wellinger, M., Smrke, S., Yeretzian, C. The SCA Water Quality Handbook. Santa Ana: Specialty Coffee Association, 2018, Web. Aug. 7, 2020). Some experts point to the importance of magnesium ions for extracting desirable compounds from coffee (Hendon, C. H., Colonna-Dashwood, L., and Colonna-Dashwood, M. The Role of Dissolved Cations in Coffee Extraction. J. Agric. Food Chem. 2014, 62, 4947-4950).

Various naturally occurring minerals are currently used for this purpose, such as calcium oxide (CaO), magnesite $MgCO_3$, calcite $CaCO_3$, or dolomite $CaMg(CO_3)_2$. These minerals suffer from drawbacks such as low or inconsistent mineral addition, variable composition, and/or result in undesirably high pH for drinking consumption.

SUMMARY

In some embodiments, the invention provides an apparatus for re-mineralizing fluid. The apparatus includes a mineralization unit having a cementitious material configured to re-mineralize the permeate stream to generate a mineralized stream. The mineralization unit includes a mineralization inlet to receive the permeate stream and a mineralization outlet to discharge the mineralized stream. The mineralized stream has a total dissolved solid (TDS) content that is greater than the permeate stream. The cementitious material includes a first magnesium-containing compound, a second magnesium-containing compound, and water present in the composition in an amount sufficient such that the composition sets to the cementitious material, the water being present in the composition at a total weight percent of at least 20%. In some embodiments, the cementitious material comprises a connected network of pores that form interstitial channels arranged to enable the passage of the fluid through the cementitious material. In some embodiments, the cementitious material is adapted to dissolve in the fluid.

In some embodiments, the apparatus further includes a filtration unit having filter media configured to separate a fluid into a retentate stream and a permeate stream, where the filtration unit has a filtration inlet to receive the fluid, a permeate outlet to discharge the permeate stream, and a retentate outlet to discharge the retentate stream. The permeate line places the permeate outlet in fluid communication with the inlet of the mineralization unit. In some embodiments, the apparatus further includes a vessel having fluid configured to mix with the mineralized stream, where the vessel unit has a vessel inlet to receive the mineralized stream, and a vessel outlet to discharge a mineralized stream with an average mineral concentration. In some embodiments, the apparatus further includes a holding tank configured downstream of the mineralization unit. In some embodiments, the apparatus further includes a T-junction that places the holding tank in fluid communication with the mineralization unit. In some embodiments, the apparatus further includes a valve configured to regulate the flow between the holding tank and the mineralization unit. In some embodiments, the value is a T-valve that regulates the flow between the mineralization unit, the holding tank, and a downstream process unit. In some embodiments, the apparatus further includes a sensor configured to measure at least one process parameter associated with the fluid in the holding tank and a controller in electrical communication with the valve, the controller programmed to regulate the flow of the permeate stream through the mineralization unit based on the at least one process parameter. In some embodiments, the controller is programmed to regulate the flow of the permeate stream through the mineralization unit to have a residence time of at least 1 minute. In some embodiments, the process parameter is selected from a total dissolved solid (TDS) content, a fluid hardness value, a fluid level, a pH, or an alkalinity. In some embodiments, the process parameter is a total dissolved solid (TDS) content. In some embodiments, the apparatus further includes a sensor configured to measure at least one process parameter associated with the fluid exiting or entering the mineralization unit and a controller in electrical communication with the valve, the controller programmed to regulate the flow of the mineralized fluid to the holding tank based on the at least one process parameter.

Some embodiments provide a composition capable of setting to produce a cementitious material for use in re-mineralizing a fluid. The cementitious material comprises two magnesium-containing compounds. In some embodiments, the molar fraction of first magnesium-containing compound in the composition exceeds the molar fraction of the second magnesium-containing compound. In some embodiments, the first magnesium-containing compound is magnesium oxide. In some embodiments, the magnesium oxide is calcined at a temperature of about 1500° C. or less. In some embodiments, the magnesium oxide is calcined at a temperature of greater than about 1000° C. but less than about 1500° C. In some embodiments, the second magnesium-containing compound is magnesium sulfate. In some embodiments, the second magnesium-containing compound includes magnesium and an anion. In some embodiments, the second magnesium-containing compound is selected from group consisting of magnesium sulfate, magnesium chloride, and magnesium phosphate. In some embodiments, the composition includes a ratio of the first magnesium-containing compound to the second magnesium-containing compound of at least about 1.25 to about 1. In some embodiments, the composition includes a ratio of the first magnesium-containing compound to the second magnesium-containing compound between about 2 to about 1 and about 13 to about 1. In some embodiments, the molar fraction of the first magnesium-containing compound in the composition is between about 15% to about 75%. In some embodiments, the molar fraction of the second magnesium-containing compound in the composition is between about 1% to about 35%. In some embodiments, the composition includes a ratio of water to the second magnesium-containing compound of at least about 1.5 to about 1. In some embodiments, the composition includes a ratio of water to the second magnesium-containing compound between about 1.5 to about 1 and about 30 to about 1. In some embodiments, the composition includes a molar fraction of water between about 20% to about 70%.

The composition further includes water present in an amount sufficient such that the composition sets to a cementitious material, the water having a total weight percent of at least 20%. In some embodiments, the cementitious material includes a connected network of pores that form interstitial channels arranged to enable the passage of fluid through the cementitious material. In some embodiments, the cementitious material has a porosity of at least about 1%. In some embodiments, the composition includes at least one additive. In some embodiments, the additive is present in the composition in an amount between about 0.1% to about 10%. In some embodiments, the additive is an organic acid. In some embodiments, the additive includes at least one of a flavorant, a sweetener, a vitamin, or a mineral. In some embodiments, the additive includes a binder or inert filler selected from a pozzolan, a clay, a sand, a polymer, a synthetic or natural fiber, or a surfactant. In some embodiments, the cementitious material being substantially free of a water-resistant modifier. In some embodiments, the cementitious material is adapted to dissolve or degrade in the fluid.

The foregoing and other aspects and advantages will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1:
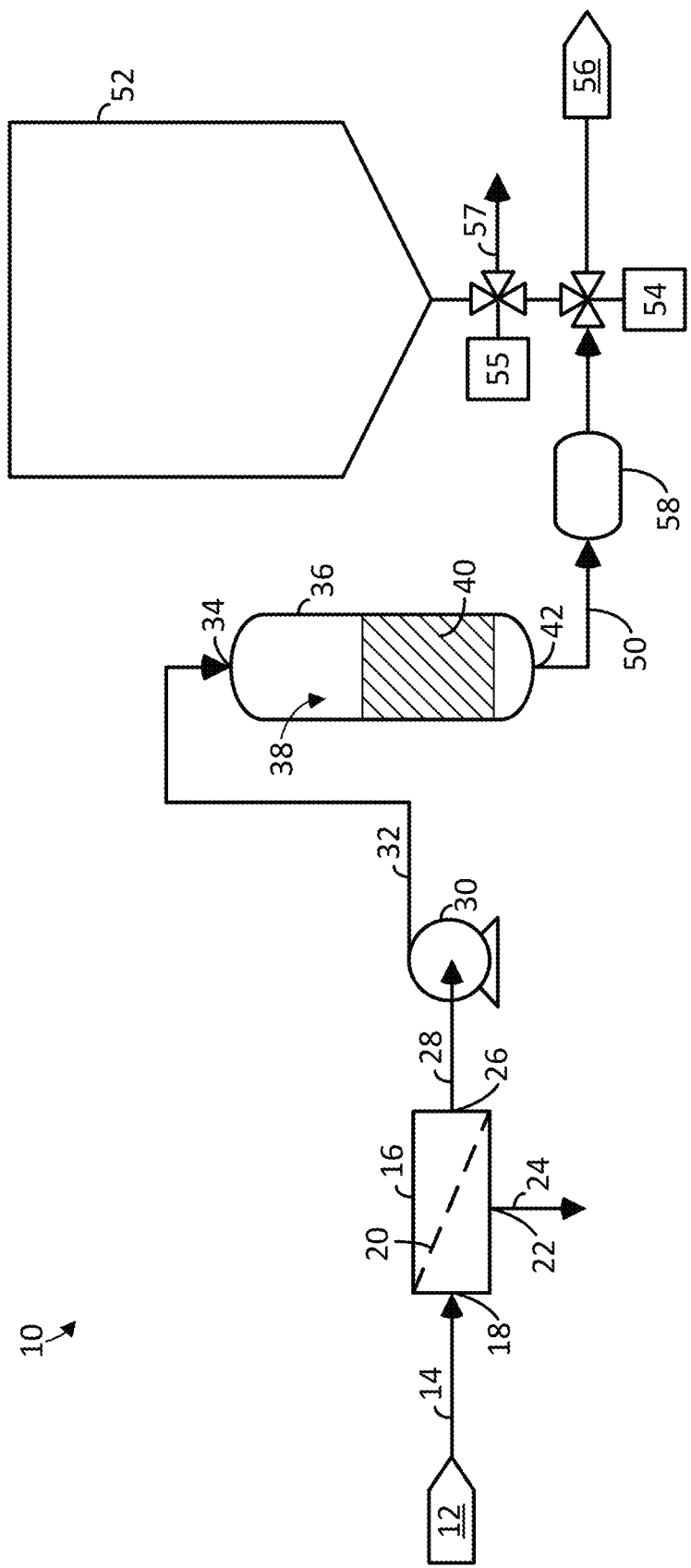
FIG. 1 is schematic illustration of an apparatus for re-mineralizing a fluid in accordance with one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an apparatus 10 for mineralizing a filtered fluid. The apparatus 10 includes a feed line 14 that places a filtration unit 16 in fluid communication with a fluid source 12. Fluid (e.g., water) from the fluid source 12 may be transported to the filtration unit 16 by a fluid transport device (not shown), such as a pump. In some embodiments, the fluid source 12 includes a fluid having solute and contaminants in need of filtering. Exemplary solutes and contaminants include, but are not limited to, metal ions, aqueous salts, sediment, bacteria, and/or pharmaceuticals.

The filtration unit 16 includes a filtration inlet 18 configured to receive the feed line 14, and place the filtration unit 16 in fluid communication with the fluid source 12. Filter media 20 is positioned within the filtration unit 16 to separate the fluid into a retentate stream having fluid, solute, and contaminants that are rejected or retained by the filter media 20, and a permeate stream having filtered fluid that permeates or diffuses through the filter media 20. The filtration unit 16 includes a retentate outlet 22 that discharges the retentate stream into a retentate line 24. The retentate line 24 may be configured to direct the retentate stream to a drain to be discarded or further processed. The filtration unit 16 includes a permeate outlet 26 that discharges the permeate stream into a permeate line 28.

In some embodiments, the filtration media 20 rejects at least 50% of the contaminants in the fluid stream, or at least 60%, 70%, 80%, 90%, 95%, 96%, 97%, 98%, 99%, 99.5%, or 99.9% of the contaminants. Although a single filtration unit 16 is illustrated in FIG. 1, it is to be understood that multiple filtration units (e.g., 1, 2, 10, 20, or more) could be connected in parallel or in series to filter the fluid. Suitable filter media 20 for the filtration unit 16 includes semi-permeable membranes. In some embodiments, the semi-permeable membranes have pore sizes and compositions suited for reverse osmosis or nanofiltration.

Exemplary semi-permeable membranes include thin-film composite membranes (TFC or TFM) formed from synthetic or polymeric materials, such as polyamides, polyethersulfones, polysulfones, and/or a support material (e.g., nonwoven fabric). The filter media 20 may be arranged in a variety of formats within the filtration unit 16 and may be in the form of tubular membranes, hollow fiber membranes, spiral wound membranes, plate and frame membranes, or as flat sheet membranes.

In some embodiments, the apparatus 10 includes a pump 30 having a suction side connected to the permeate line 28 and a discharge side connected to a mineralization feed line 32. The mineralization feed line 32 places the pump 30 in fluid communication with a mineralization unit 36. In general, the pump 30 is configured to increase the pressure of the permeate line 28, and may be used to control the flow rate of the permeate stream to the mineralization unit 36.

The mineralization unit 36 includes a mineralization inlet 34 configured to place an internal chamber 38 of the mineralization unit 36 in fluid communication with the mineralization feed line 32. In general, the mineralization unit 36 is configured to place the permeate stream in contact with a cementitious material 40 to generate a mineralized stream that discharges from the mineralization unit 36 through a mineralization outlet 42. As used herein, the term "mineralized stream" may refer to a permeate stream that has become enriched in minerals and/or additives. The mineralized stream includes a TDS content that is greater than the permeate stream. As the permeate stream contacts and/or flows through the cementitious material 40, the cementitious material 40 is adapted to degrade within the mineralization unit 36 over a duration, resulting in a mineralized stream enriched in minerals and additives.

Referring back to FIG. 1, the mineralized stream discharges from the mineralization unit 36 through a mineralization outlet 42. A mineralization line 50 places the mineralization unit 36 in fluid communication with a holding tank 52. A valve 54 may regulate the flow between the mineralization unit 36, the holding tank 52, and one or more downstream processing units. A second valve 55 may regulate the flow from the holding tank 52 to a drain 57. In some embodiments, the holding tank 52 is configured to store mineralized fluid for downstream fluid demand from the downstream process unit 56, which may include a point-of-entry system (e.g., for a user's home), or a point-of-use system (e.g., sink, fluid dispensing unit).

As used in reference to the cementitious material 40 described herein, the term "degrade" or "degradation" may refer to a decrease in volume or size of the cementitious material 40 relative to an original volume or mass. The degradation of the cementitious material 40 can occur via dissolution of the cementitious material 40 when placed in contact with the permeate stream. The dissolution of the cementitious material 40 results in the enrichment of the permeate stream with minerals and additives from the cementitious material 40.

In some embodiments, the cementitious material 40 can be adapted to degrade at a pre-determined rate to selectively increase or achieve a desired yield of total dissolve solids (TDS) in the mineralized stream. For example, the cementitious material 40 may be adapted to degrade at a rate sufficient such that the mineralized stream exiting the mineralization unit 36 has a TDS content of at least 50 ppm to at least 1000 ppm, or at least 50 ppm to at least 500 ppm, or at least 100 ppm to at least 400 ppm.

In some embodiments, the TDS content of the mineralized stream exiting the mineralization unit 26 is at least 10 ppm, 20 ppm, 30 ppm, 40 ppm, 50 ppm, or at least 60 ppm, at least 70 ppm, at least 80 ppm, at least 90 ppm, at least 100 ppm, at least 110 ppm, at least 120 ppm, at least 130 ppm, at least 140 ppm, at least 150 ppm, at least 160 ppm, at least 170 ppm, at least 180 ppm, at least 190 ppm, at least 200 ppm, at least 210 ppm, at least 220 ppm, at least 230 ppm, at least 240 ppm, at least 250 ppm, at least 260 ppm, at least 270 ppm, at least 280 ppm, at least 290 ppm, at least 300 ppm, at least 310 ppm, at least 320 ppm, at least 330 ppm, at least 340 ppm, at least 350 ppm, at least 360 ppm, at least 370 ppm, at least 380 ppm, at least 390 ppm, at least 400 ppm, or more.

In some embodiments, the cementitious material 40 may be adapted to degrade at a rate sufficient such that the mineralized stream has a TDS content that is at least 80 times greater than the permeate stream. In some embodiments, the mineralized stream has a TDS content that is at least 70 times greater than the permeate stream, or 60 times greater, or 50 times greater, or 40 times greater, or 30 times greater, or 20 times greater, or 18 times greater, or 16 times greater, or 14 times greater, or 12 times greater, or 10 times greater, or 8 times greater than the permeate stream. In some embodiments, the permeate stream exiting the filtration unit 16 includes a TDS content between 1 ppm and 50 ppm, or between 5 ppm and 20 ppm.

One disadvantage associated with conventional mineralization cements (e.g., dolomite) is that the mineralized stream exiting the unit has a pH that exceeds recommended alkalinity for drinking water (e.g., a pH of 9.5 or greater), and needs subsequent treatment to reduce the pH to within drinkable levels. One advantage of various embodiments described herein is that the cementitious material 40 may be adapted to degrade at a rate sufficient such that the mineralized stream exiting the mineralization unit 36 has a pH within drinkable limits (e.g., between about 7 to about 9.5), without the need for subsequent treatment such as reducing the pH with an acidic additive. In some embodiments, the mineralized stream exiting the mineralization unit 36 has a pH of 7, or 7.1, or 7.2, or 7.3, or 7.4, or 7.5, or 7.6, or 7.7, or 7.8, or 7.9, or 8, or 8.1, or 8.2, or 8.3, or 8.4, or 8.5, or 8.6, or 8.7, or 8.8, or 8.9, or 9, or 9.1, or 9.2, or 9.3, or 9.4, or 9.5, or 9.6, or 9.7, or 9.8, or 9.9, or less than 10.

Figure 2B:
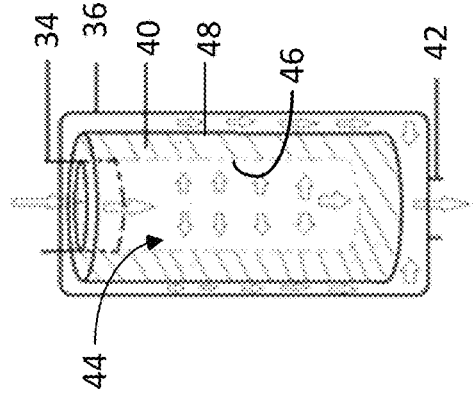
FIG. 2A-2D are schematic illustrations of a cementitious material positioned within a mineralization unit in accordance with embodiments disclosed herein.
Figure 2D:
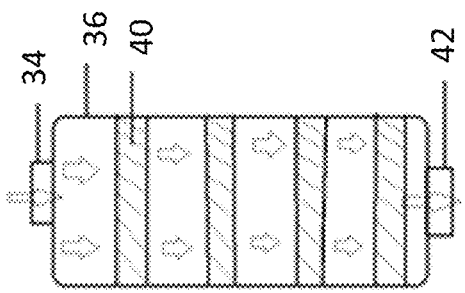
Figure 2A:
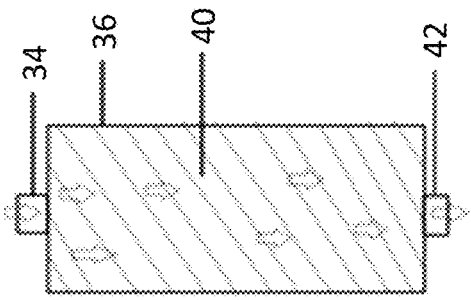

The cementitious material 40 may be arranged within the mineralization unit 36 in a variety of formats. Referring to FIG. 2A, the cementitious material 40 may be arranged in the mineralization unit 36 in a fixed bed arrangement such that the permeate stream flows through the cementitious material 40. For example, the cementitious material 40 may have a connected network of pores that form interstitial channels arranged to enable the passage of permeate through the cementitious material 40. Referring to FIG. 2B, the cementitious material 40 may be arranged in the mineralization unit 36 such that the permeate stream follows a radial flow pattern. For example, the cementitious material 40 may include an inner cavity 44 to allow the permeate stream to flow from an inside surface 46 of the cementitious material 40 to an outside surface 48 of the cementitious material 40.

Figure 2C:
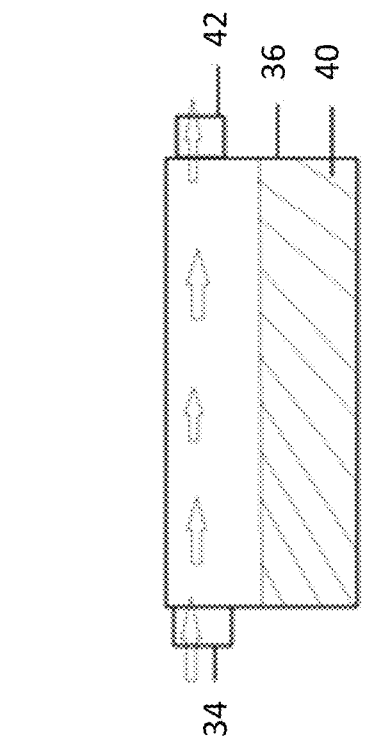

Referring to FIG. 2C, the cementitious material 40 may be arranged in the mineralization unit 36 such that the permeate stream contacts the cementitious material 40, but does not flow through the cementitious material 40. For example, the permeate stream may horizontally or vertically flow through the mineralization unit 36 and flow adjacent to the cementitious material 40. Referring to FIG. 2D, the cementitious material 40 may be arranged in the mineralization unit 36 as a series of fixed beds or "disks" positioned within the mineralization unit. Each of the fixed beds may be arranged such that the permeate stream flows through each of the fixed beds within the mineralization unit 36.

As used herein, the term "cementitious material" may refer to the product of a complex chemical reaction that takes place when one or more inorganic materials (e.g., MgO, $MgSO_4$) reacts with water to form various hydration products with nanoscale or microscale features that are arranged in a multi-scale fashion to form a solid or semi-solid three-dimensional product. The cementitious material 40 may be formed by reacting, combining, mixing, and/or heating one or more inorganic materials in the presence of water until the composition sets in to a rigid or semi-rigid product.

Some embodiments include a composition capable of setting to produce the cementitious material 40. The composition may include a first magnesium-containing compound, a salt of an acid, and water present in the composition in an amount sufficient such that the composition sets to the cementitious material 40.

In some embodiments, the first magnesium-containing compound comprises magnesium oxide. As used herein, the term "salt of an acid" may refer to a cation of a base that neutralizes an anion of the acid to form a salt. The anion of the acid may be from a strong acid (generally defined as a pKa<−1.4 in water) or a weak acid (generally defined as a pKa>−1.4 in water). In some embodiments, suitable cations include, but are not limited to, magnesium, calcium, and ammonia. In some embodiments, suitable anions include chloride, sulfate, and phosphate. In some embodiments, the salt of an acid for the composition capable of setting includes a second magnesium-containing compound. Exemplary second magnesium-containing compounds include, but are not limited to, magnesium sulfate ($MgSO_4$), magnesium chloride ($MgCl_2$), and magnesium phosphate (e.g., $Mg(H_2PO_4)_2$), $MgHPO_4$, $Mg_3(PO_4)_2$), hydrates and combinations thereof.

In some embodiments, the first magnesium-containing compound and the second magnesium-containing compound are magnesium oxide and magnesium sulfate. Mixing, combining, and/or heating magnesium oxide and magnesium sulfate in the presence of water generates magnesium oxysulfate (MOS). Magnesium oxysulfate exists in various phases of the general formula X—$Mg(OH)_2$.Y—$MgSO_4$.Z—$H_2O$, where depending on the phase X may range between 1 to 5, Y may range between 1 to 2, and Z may range between 1 to 8. Without limiting the scope of the invention, the cementitious material 40 may include various relative contents of $5Mg(OH)_2$.$MgSO_4$.$3H_2O$ (513 phase), $3Mg(OH)_2$.$MgSO_4$.$8H_2O$ (318 phase), $Mg(OH)_2$.$2MgSO_4$.$H_2O$ (123 phase), $Mg(OH)_2$.$MgSO_4$.$5H_2O$ (115 phase), $5Mg(OH)_2$.$2MgSO_4$.$7H_2O$ (527 phase). The phase may be characterized using conventional methods known to those skilled in the art. For example, the phases of the cementitious material 40 may be characterized using X-ray diffraction, scanning electron microscope (SEM), chemical and thermal analysis.

The mechanical strength and solvent solubility of the cementitious material 40 depends on the type and relative content of the crystal phases in the cementitious material 40. The desired performance characteristics, such as volume stability and selective solvent degradation, may be achieved by adjusting the concentration of magnesium oxide, magnesium sulfate, water, and other additives in the settable composition.

In some embodiments, the first magnesium-containing compound is present in the settable composition in an amount between 15% to 80% (w/w). In some embodiments, the first magnesium-containing compound is present in the settable composition in an amount of at least 15%(w/w), or at least 16%, or at least 17%, or at least 18%, or at least 19%, or at least 20%, or at least 21%, or at least 22%, or at least 23% or at least 24%, or at least 25%, or at least 26%, or at least 27%, or at least 28%, or at least 29%, or at least 30%, or at least 31%, or at least 32%, or at least 33%, or at least 34%, or at least 35%, or at least 36%, or at least 31%, or at least 32%, or at least 33%, or at least 34%, or at least 35%, or at least 36%, or at least 37%, or at least 38%, or at least 39%, or at least 40%, or at least 41%, or at least 42%, or at least 43%, or at least 44%, or least 45%, or at least 46%, or at least 47%, or at least 48%, or at least 49%, or at least 50%, or at least 51%, or at least 52%, or at least 53%, or at least 54%, or at least 55%, or at least 56%, or at least 57%, or at least 58%, or at least 59%, or at least 60%, or at least 61%, or at least 62%, or at least 63%, or at least 64%, or least 65%, or at least 66%, or at least 67%, or at least 68%, or at least 69%%, or at least 70%, or at least 71%, or at least 72%, or at least 73%, or at least 74%, or at least 75%, or at least 76%, or at least 77%, or at least 78%, or at least 79%, or at least 80% (w/w), or more.

In some embodiments, the salt of a strong acid is present in the settable composition in an amount of 0.1% to 35% (w/w). In some embodiments, the salt of an acid (e.g., magnesium sulfate) is present in the settable composition in an amount of at least 0.1%, or at least 1%, or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 16%, or at least 17%, or at least 18%, or at least 19%, or at least 20%, or at least 21%, or at least 22%, or at least 23%, or at least 24%, or at least 25%, or at least 26%, or at least 27%, or at least 28%, or at least 29%, or at least 30%, or at least 31%, or at least 32%, or at least 33%, or at least 34%, or at least 35% (w/w), or more.

In some embodiments, the composition capable of setting includes a weight ratio of water between 20% and 70% (w/w). In some embodiments, the composition capable of setting includes water at a weight ratio of at least 20% (w/w), or at least 21%, or at least 22%, or at least 23% or at least 24%, or at least 25%, or at least 26%, or at least 27%, or at least 28%, or at least 29%, or at least 30%, or at least 31%, or at least 32%, or at least 33%, or at least 34%, or at least 35%, or at least 36%, or at least 37%, or at least 38%, or at least 39%, or at least 40%, or at least 41%, or at least 42%, or at least 43%, or at least 44%, or least 45%, or at least 46%, or at least 47%, or at least 48%, or at least 49%, or at least 50%, or at least 51%, or at least 52%, or at least 53%, or at least 54%, or at least 55%, or at least 56%, or at least 57%, or at least 58%, or at least 59%, or at least 60%, or at least 61%, or at least 62%, or at least 63%, or at least 64%, or least 65%, or at least 66%, or at least 67%, or at least 68%, or at least 69%%, or at least 70% (w/w), or more.

In some embodiments, the molar fraction of the first magnesium-containing compound (e.g., magnesium oxide) in the composition capable of setting exceeds the molar fraction of the salt of an acid (e.g., magnesium sulfate). In some embodiments, the composition capable of setting includes a ratio of the first magnesium-containing compound (e.g., magnesium oxide) to the salt of an acid (e.g., magnesium sulfate) of at least 1.25:1. In some embodiments, the ratio of magnesium oxide to magnesium sulfate is at least 2:1, or 3:1, or 4:1, or 5:1, or 6:1, or 7:1, or 8:1, or 9:1, or 10:1, or 11:1, or 12:1, or 13:1, or 14:1, or 15:1. In some embodiments, the ratio is a molar ratio or a weight ratio.

In some embodiments, the composition capable of setting includes a ratio of the first magnesium-containing compound (e.g., magnesium oxide) to water between 0.1:1 and 5:1. In some embodiments, the composition capable of setting includes a ratio of the first magnesium-containing compound to water of 0.1:1, or 0.2:1, or 0.3:1, or 0.4:1, or 0.5:1, or 0.6:1, or 0.7:1, or 0.8:1, or 0.9:1, 1:1, or 1.5:1, or 2:1, or 2.5:1, or 3:1, or 3.5:1, or 4:1, or 4.5:1, or 5:1. In some embodiments, the ratio is a molar ratio or a weight ratio.

In some embodiments, the rate of reaction and material properties may be adjusted by one skilled in the art by selecting a magnesium oxide that has been calcined at specific temperatures. In some embodiments, the calcining temperature may be defined as 'light burned', including but not limited to 700° C., or 800° C., or 900° C., or 1000° C. In some embodiments, the calcining temperature may be defined as 'hard burned', including but not limited to 1100° C., or 1200° C., or 1300° C., or 1400° C., or 1500° C. Since magnesium oxide calcined at 1,600° C. or more, defined as 'dead burned', is largely unreactive, it is preferred to keep the calcining temperature at or below 1,500° C. Since 'light burned' MgO is highly reactive, it is most preferred to keep the calcining temperature between 1,000° C. and 1,500° C.

In some embodiments, the composition capable of setting includes a ratio of the salt of an acid (e.g., magnesium sulfate) to water of 0.5:1 to 30:1. In some embodiments, the composition capable of setting includes a ratio of salt of an acid compound to water of 0.5:1, or 0.6:1, or 0.7:1, or 0.8:1, or 0.9:1, 1:1, or 2:1, or 3:1, or 4:1, or 5:1, or 6:1, or 7:1, or 8:1, or 9:1, or 10:1, or 11:1, or 12:1, or 13:1, or 14:1, or 15:1, or 16:1, or 17:1, or 18:1, or 19:1, or 20:1, or 21:1, or 22:1, or 23:1, or 24:1, or 25:1, or 26:1, or 27:1, or 28:1, or 29:1, or 30:1. In some embodiments, the ratio is a molar ratio or a weight ratio.

In some embodiments, the cementitious material 40 described herein can comprise porous structures. In some embodiments, the pore size may be utilized to modulate the degradation rate and volume retention rate of the cementitious material 40 when placed in contact with a permeate stream. The pore size of the cementitious material 40 may modulate the release profile of an additive embedded therein. As used herein, the terms "porous" and "porosity" are generally used to describe a structure having a connected network of pores or void spaces (which can, for example, be openings, interstitial spaces or other channels) throughout its volume. The term "porosity" is a measure of void spaces in a material, and is a fraction of volume of voids over the total volume, as a percentage between 0 and 100% (or between 0 and 1).

In some embodiments, the cementitious material 40 can be configured to have any porosity, depending on the desired properties. For example, in some embodiments, the porous cementitious material 40 can have a porosity of at least 1%, at least 3%, at least 5%, at least 10%, at least 15%, at least 20%, at least 25%, at least 30%, at least 40%, at least 50%, at least 60%, at least 70%, at least 80%, at least 90% or higher. In some embodiments, the porosity can range from about 1% to about 40%, from 1% to 30%, from 1% to 10%, or from 1% to 5%. The pore size and total porosity values can be quantified using conventional methods and models known to those of skill in the art. For example, the pore size and porosity can be measured by standardized techniques, such as mercury porosimetry and nitrogen adsorption. One of ordinary skill in the art can determine the optimal porosity of the cementitious material for various purposes. For example, the porosity and/or pore size of the cementitious material 40 can be provided based on the desired degradation rate or volume retention rate of the cementitious material 40, and/or release profiles of an additive from the cementitious material 40.

In some embodiments, the cementitious material 40 can be adapted to have a pore size of 10 nm to 1500 µm, or 1 µm to 1000 µm, or 1 µµm to 200 µm. In some embodiments, the cementitious material 40 may have pores with a pore size of less than 1000 µm, or less than 900 µm, or less than 800 µm, or less than 700 µm, or less than 600 µm, or less than 500 µm, or less than 400 µm, or less than 300 µm, or less than 200 µm, or less than 150 µm, or less than 100 µm, or less than 50 µm, or less than 40 µm, or less than 30 µm, or less than 20 µm, or less than 10 µm, or less than 5 µm. The term "pore size" as used herein refers to a dimension of a pore. In some embodiments, the pore size can refer to the longest dimension of a pore, e.g., a diameter of a pore having a circular cross section, or the length of the longest cross-sectional chord that can be constructed across a pore having a non-circular cross-section. In other embodiments, the pore size can refer to the shortest dimension of a pore.

In some embodiments, the cementitious material 40 may include one or more additive. The additive can be mixed, dispersed, suspended within, or coated onto the cementitious material 40. In some embodiments, the additive can be distributed, embedded, or encapsulated in the cementitious material 40. In some embodiments, the additive can be coated on a surface of the cementitious material 40. In some embodiments, the additive is mixed with the composition capable of setting. The term additive can encompass combinations or mixtures of two or more additives described herein. Suitable additives may enhance the stability, rigidity, or degradation properties of the cementitious material 40. Alternatively or additionally, the additive may influence a flavor profile of the mineralized stream.

In some embodiments, the additives are present in the composition capable of setting or the cementitious material 40 in a weight ratio of 0.1 to 20% (w/w). In some embodiments the additive is present in the composition of at least 0.1% (w/w), or at least 1%, or at least 1%, or at least 2%, or at least 3%, or at least 4%, or at least 5%, or at least 6%, or at least 7%, or at least 8%, or at least 9%, or at least 10%, or at least 11%, or at least 12%, or at least 13%, or at least 14%, or at least 15%, or at least 16%, or at least 17%, or at least 18%, or at least 19%, or at least 20% (w/w).

In some embodiments, the additive includes one or more organic acids and their salts including, but not limited to, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations thereof. In some embodiments, the organic acid is a food grade acid, such as citric acid.

In some embodiments, the additive includes one or more flavorant or sweeteners including, but not limited to, natural and synthetic flavorants. Exemplary flavorants include orange, lemon, lime grapefruit, tangerine, mandarin orange, tangelo, pomelo, apple, grape, cherry, and pineapple flavors, cola flavors, tea flavors, cassia, clove, cinnamon, pepper, ginger, vanilla spice flavorings, cardamom, coriander, root beer, sassafras, ginseng, and mixtures thereof. Flavorants may be provided in the form of an extract, powder, oleoresin, juice concentrate, bottler's base, or other forms known in the art.

In some embodiments, the additive includes one or more vitamins including, for example, Vitamins A, D, E (tocopherol), C (ascorbic acid), B (thiamine), B2 (riboflavin), B6, B12, K, niacin, folic acid, biotin, and combinations thereof.

In some embodiments, the additive includes one or more mineral or electrolyte and their salts including, but not limited to calcium, magnesium, potassium, sodium, bicarbonate, copper, selenium, iron, and zinc.

In some embodiments, the additive includes one or more antioxidants selected from rutin, quercetin, flavonones, flavones, dihydroflavonols, flavonols, flavandiols, leucoanthocyanidins, flavonol glycosides, flavonone glycosides, isoflavonoids, and neoflavonoids. In particular, the flavonoids may be, but not limited to, quercetin, eriocitrin, neoeriocitrin, narirutin, naringin, hesperidin, hesperetin, neohesperidin, neoponcirin, poncirin, rutin, isorhoifolin, rhoifolin, diosmin, neodiosmin, sinensetin, nobiletin, tangeritin, catechin, catechin gallate, epigallocatechin, epigallocatechin gallate, oolong tea polymerized polyphenol, anthocyanin, heptamethoxyflavone, daidzin, daidzein, biochaminn A, prunetin, genistin, glycitein, glycitin, genistein, 6,7,4' trihydroxy isoflavone, morin, apigenin, vitexin, balcalein, apiin, cupressuflavone, datiscetin, diosmetin, fisetin, galangin, gossypetin, geraldol, hinokiflavone, primuletin, pratol, luteolin, myricetin, orientin, robinetin, quercetagetin, and hydroxy-4-flavone.

In some embodiments, the additive includes a binder or inert filler. Exemplary binders or inert fillers include, but are not limited to, calcium carbonate, calcium oxide, calcium sulfate, pozzolans, clays, sands, polymers, synthetic or natural fibers, or surfactants (e.g., air entrapping surfactants). In some embodiments, suitable pozzolans include diatoms, pumice, fly-ash, kilned clays, fumed silicas, or silicon dioxide.

In some embodiments, the composition capable of setting or the cementitious material 40 is substantially free of water-resistant modifiers. As used herein, the term water-resistant modifier is generally used to describe a compound that is added to the cementitious material 40 or composition capable of setting to increase the materials resistance to degrading in an aqueous solution, or increase water repellency, or increase water penetration into the material. Exemplary water-resistant modifiers include, but are not limited to, fly-ash, phosphates, polymers (e.g., styrene-butadiene, vinyl acetate ethylene), siloxane, silica. The term "substantially free" may refer to a composition that includes less than 5% (w/w), or less than 4%, or less than 3%, or less than 2%, or less than 1% (w/w) of the specified component.

One disadvantage associated with conventional mineralization systems is that the conventional mineralizer (e.g., dolomite) is configured downstream of a conventional holding tank. In this arrangement, the conventional mineralizer only experiences flow in times of demand. This is disadvantaged because it is difficult to fully mineralize the flowing fluid at high flow and low residence times. In the conventional arrangement, output mineralization levels are often cyclic and inconsistent based on fluid flow.

Unlike conventional mineralizers, some embodiments have the mineralization unit 36 configured upstream of the holding tank 52. Such an arrangement reduces cyclic mineralization output levels, and reduces the likelihood of delivering an under mineralized fluid to the downstream process unit 56. For example, during times of low or no downstream fluid demand from the downstream process unit 56, the low flow output of the filtration unit 16 flows through the mineralization unit 36, and fills the holding tank 52. Once the tank is full, the output from the filtration unit 16 stops, flow through the mineralization unit 16 stops, and the permeate stream in the mineralization unit 16 is idle until downstream demand resumes. At this point, the permeate stream approaches a saturated, mineralized stream. When downstream demand resumes, the saturated water flows out of the mineralization unit 16, but is blended with the fluid in the holding tank 52, which may have been mineralized under flow conditions, and is at a lower mineral content. In this way, cyclic mineralization levels delivered to the downstream processing unit 56 may be reduced in relation to the position of the mineralization outlet 42.

Some embodiments may include an extra pass-through tank 58 (see FIG. 1) provided in the mineralization line 50, between the mineralization outlet 42 and the downstream process unit 56 to hold previously mineralized water from the mineralization unit 36, so that water delivered to the downstream process unit 56 will have a more average mineral level, as flow rate and dwell time through the mineralization unit 36 may produce variation in mineral content which would be averaged as water mixes in the extra pass-through tank 58.

Figure 3:
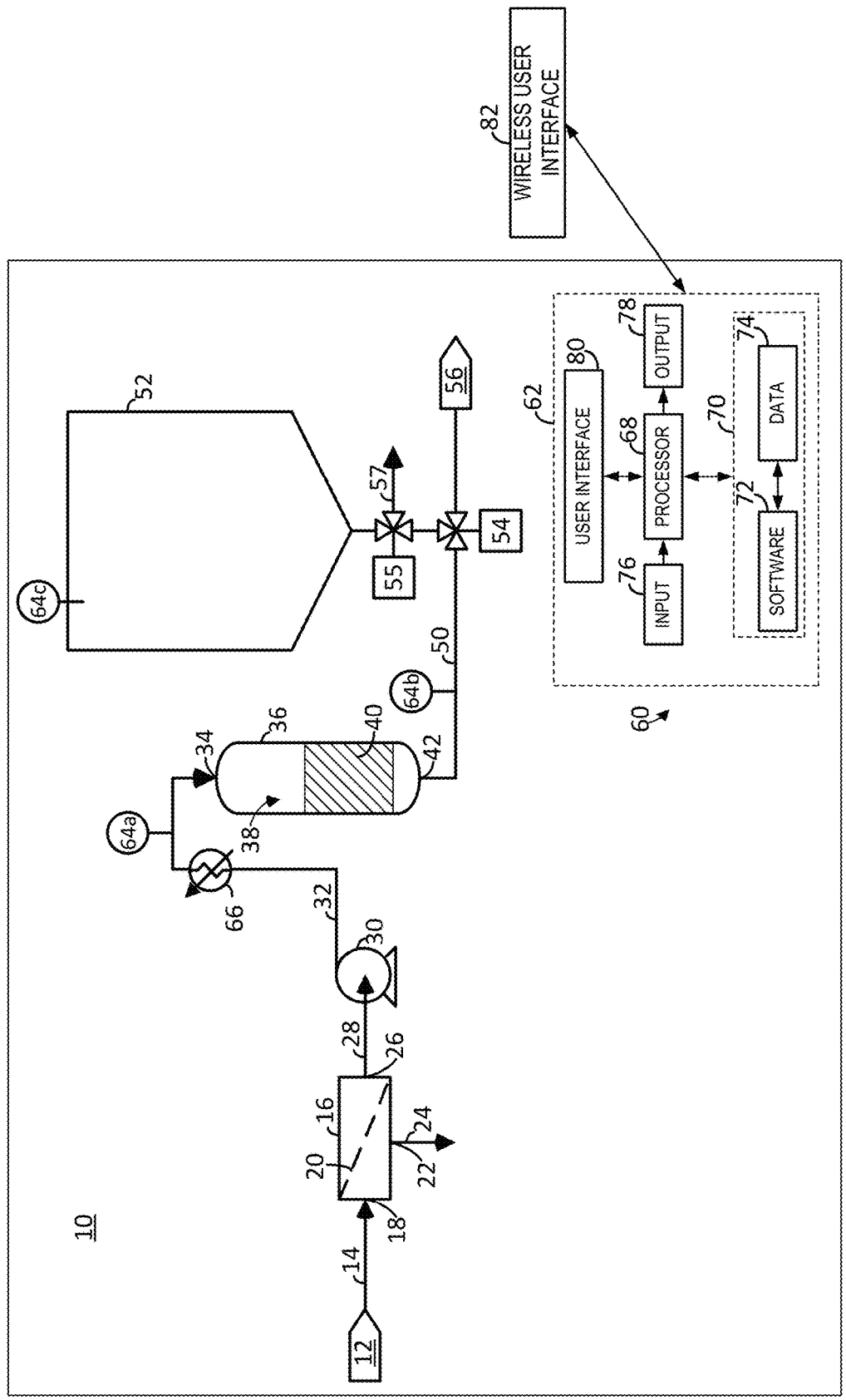
FIG. 3 is a schematic illustration of a control system in conjunction with the apparatus of FIG. 1.

FIG. 3 illustrates an apparatus 10 used in conjunction with an example process control system 60 according to some embodiments of the invention. The process control system 60 may be configured to control the operation of the apparatus 10. For example, the process control system 60 may assist in starting the process, stopping the process, and adjusting one or more process parameters to change the process performance. In some embodiments, the control system 60 may be designed to control the total dissolved solids (TDS) content of mineralized stream, a fluid hardness value of the mineralized stream, a fluid level of the holding tank, or a pH of the mineralized stream.

In some embodiments, the control system 60 may adjust or control a multitude of process parameters to maintain a TDS content of the mineralized stream. For example, the control system 60 may adjust or control the apparatus 10 to maintain the TDS content of the mineralized stream to a desired threshold. In some embodiments, the control system 60 may adjust or control the apparatus 10 to maintain a pH of the mineralized stream to be within 7 to 9.5.

In some embodiments, the control system 60 includes a controller 62, one or more process measuring devices (e.g., 64a-64c), one or more process control devices (e.g., the pump 30, a temperature control device 66 designed to increase or decrease the temperature of the mineralization feed line 32, the valve 54, and the valve 55), and suitable connections that allow process information acquired by the one or more measuring devices to be transferred to the controller 62, and output information from the controller 62 to be transferred to the one or more process control devices to perform a process control action. Example process control actions may include using the pump 30 to alter a flowrate, using the temperature control device 66 to increase or decrease the temperature of the permeate stream (e.g., increasing temperature increases the degradation rate of the cementitious material 40), and/or using valves 54, 55 to alter a pressure based on one or more measured values from the process measuring devices.

In some embodiments, valves 54, 55 are optional. For example, the valve 54 may be replaced with a T-junction that places the mineralization unit 36 in fluid communication with the holding tank 52 and the downstream processing unit 56. In some embodiments, the valve 55 and drain line 57 may be removed and replaced with a line that places the T-junction in fluid communication with the holding tank 52.

The controller 62 includes a processor 68 and a memory 70 that includes software 72 and data 74, and is designed for storage and retrieval of processed information to be processed by the processor 68. The processor 68 includes an input 76 that is configured to receive process signals from the one or more of the measuring devices (64a-64c) and the one or more of the process control devices (e.g., 30, 54, 55, 66) via the input 54. The controller 62 may operate autonomously or semi-autonomously, or may read executable software instructions from the memory 70 or a computer-readable medium (e.g., a hard drive, a CD-ROM, flash memory), or may receive instructions via the input 76 from a user, or another source logically connected to a computer or device, such as another networked computer or server. For example, the server may be used to control the apparatus 10 via the controller 62 on-site or remotely, (e.g., cloud computing). In some embodiments, the controller 62 may include a wired user interface 80 and/or a wireless user interface 82. A user may use the wired or wireless user interfaces to input parameters into the controller 62 to induce or manually control the process control actions discussed herein.

The processor 68 may process the process the signals to generate an output 78, which may take the form of a process control action. Example process control actions may include sending signals to the one or more process control devices (e.g., 30, 54, 55, and/or 66) to effectuate a change in one or more process parameters (e.g., pressure, flowrate, and/or temperature) of one or more process streams in apparatus 10.

Suitable connections may include transmitters that allow process signals, such as electrical signals or gas pressure signals (e.g., air, nitrogen, etc.), to be transmitted between the controller 62 and the measuring devices (e.g., 64a-64c) and the process control devices (e.g., 30, 54, 55, 66). In some aspects, the electrical signals may be transferred via a wired connection or through a wireless network connection. Other hardware elements may be included in the process control system, for example, transducers, analog-to-digital (A/D) converters, and digital-to-analog (D/A) converters that allow process information to be recognizable in computer form, and computer commands accessible to the process. For visual clarity, the connections between the controller 62, the one or more measuring devices, and the one or more process control devices have been omitted from FIG. 3.

In some embodiments, the one or more process measuring devices 64a-64c are provided in the form of a sensor configured to measure a process parameter selected from a pressure, a temperature, a flowrate, a total dissolved solid (TDS) content, a fluid hardness value, a fluid level, and/or a pH.

In some embodiments, the controller 62 includes programming to adjust the one or more process parameter in the apparatus 10 using the one or more process control devices (e.g., 30, 54, 55, 66) in response to measured values obtained from the one or more measuring devices (64a-64c) to maintain a desired set-point in the holding tank 52. The set-point may include maintaining a desired TDS content between of at least 50 ppm to at least 1000 ppm within the holding tank 52, or at least 50 ppm to at least 500 ppm, or at least 100 ppm to at least 400 ppm. For example, in the event that the TDS content of the holding tank drops below the desired threshold, the controller 62 may do one or more of increase the temperature of the permeate stream using temperature control device 66, and/or decrease the flow rate using the pump 30, and/or adjust the fluid level of the holding tank 52 to add or remove mineralized fluid as appropriate to bring the TDS content to the desired threshold.

In some embodiments, the controller 62 includes programming to adjust the flowrate through the mineralization unit 36 such that the permeate stream has a residence time between about 1 minute and about 1 day. The flowrate may be adjusted using the pump 30 and/or the valve 54. In some embodiments, the controller 62 includes programming to adjust the flowrate through the mineralization unit 36 such that the permeate stream has a residence time of at least 1 minute, at least 2 minutes, at least 3 minutes, at least 4 minutes, at least 5 minutes, at least 10 minutes, at least 20 minutes, at least 30 minutes, at least 40 minutes, at least 50 minutes, at least 1 hour, or at least 1 day, or more.

The apparatus 10 may be used in applications for filtering and re-mineralizing an aqueous fluid stream, such as ground water, well water, rain water, seawater, industrial water sources, or other water sources containing contaminants. In some embodiments, the fluid comprises non-aqueous streams, such as an organic or non-polar solvents.

The invention has been described according to one or more preferred embodiments, and it should be appreciated that many equivalents, alternatives, variations, and modifications, aside from those expressly stated, are possible and within the scope of the invention.

The invention claimed is:

1. An apparatus for re-mineralizing an aqueous solution, the apparatus comprising:
    a mineralization unit having an inlet to receive a permeate stream, a cementitious material disposed within the mineralization unit to mineralize the permeate stream to generate a mineralized stream having a total dissolved solid (TDS) content that is greater than the permeate stream, and an outlet to discharge the mineralized stream,
    the cementitious material including a first magnesium-containing compound, a second magnesium-containing compound, water present in the composition in an amount sufficient such that the composition sets to the cementitious material, the water being present in the composition at a total weight percent of at least 20% (w/w), and
    the cementitious material designed to dissolve in the aqueous solution and being substantially free of a water-resistant modifier,
    wherein a total weight percent of $CaCO_3$ present in the cementitious material is less than 5% (w/w).

2. The apparatus of claim 1 further comprising:
    a filtration unit having filter media configured to separate a fluid into a retentate stream and the permeate stream, the filtration unit having a filtration inlet to receive the fluid, a permeate outlet to discharge the permeate stream, and a retentate outlet to discharge the retentate stream,
    wherein a permeate line places the permeate outlet in fluid communication with the inlet of the mineralization unit.

3. The apparatus of claim 1, wherein the cementitious material comprises a connected network of pores that form interstitial channels arranged to enable the passage of the fluid through the cementitious material.

4. The apparatus of claim 1 further comprising:
    a holding tank configured downstream of the mineralization unit.

5. The apparatus of claim 4 further comprising:
a T-junction that places the holding tank in fluid communication with the mineralization unit.

6. The apparatus of claim 5 further comprising:
a valve configured to regulate the flow between the holding tank and the mineralization unit.

7. The apparatus of claim 6, wherein the valve is a T-valve that regulates the flow between the mineralization unit, the holding tank, and a downstream process unit.

8. The apparatus of claim 6 further comprising:
a sensor configured to measure at least one process parameter associated with the fluid in the holding tank;
a controller in electrical communication with the valve, the controller programmed to:
regulate the flow of the permeate stream through the mineralization unit based on the at least one process parameter.

9. The apparatus of claim 8, wherein the controller is programmed to:
regulate the flow of the permeate stream through the mineralization unit to have a residence time of at least 1 minute.

10. The apparatus of claim 8, wherein the at least one process parameter is selected from a total dissolved solid (TDS) content, a fluid hardness value, a fluid level, a pH, or an alkalinity.

11. The apparatus of claim 6, wherein
a sensor configured to measure at least one process parameter associated with the fluid exiting or entering the mineralization unit;
a controller in electrical communication with the valve, the controller programmed to:
regulate the flow of the mineralized fluid to the holding tank based on the at least one process parameter.

12. The apparatus of claim 1 further comprising:
a vessel downstream of the mineralization unit, wherein the output from the mineralization unit is forced through the vessel and mixed with the aqueous solution contained within.

13. A composition capable of setting to produce a cementitious material for use in re-mineralizing an aqueous solution, the composition comprising:
a first magnesium-containing compound, a second magnesium-containing compound, water present in the composition in an amount sufficient such that the composition sets to the cementitious material, the water being present in the composition at a total weight percent of at least 20% (w/w), and less than 5% (w/w) total weight percent $CaCO_3$,
the cementitious material being designed to dissolve in the aqueous solution,
wherein the cementitious material is substantially free of a water-resistant modifier.

14. The composition of claim 13, wherein the molar fraction of first magnesium-containing compound in the composition exceeds the molar fraction of the second magnesium-containing compound.

15. The composition of claim 13, wherein the first magnesium-containing compound is magnesium oxide.

16. The composition of claim 13, wherein the second magnesium-containing compound includes magnesium and an anion.

17. The composition of claim 13, wherein the cementitious material includes a connected network of pores that form interstitial channels arranged to enable the passage of the aqueous solution through the cementitious material.

18. The composition of claim 13, wherein the composition includes at least one additive.

19. A composition capable of setting to produce a cementitious material for use in re-mineralizing an aqueous solution, the composition comprising:
a first magnesium-containing compound present in the composition at a total weight percent of at least 15% (w/w), a second magnesium-containing compound, water present in the composition in an amount sufficient such that the composition sets to the cementitious material, and less than 5% (w/w) total weight percent $CaCO_3$,
the cementitious material being substantially free of a water-resistant modifier, and
the cementitious material designed to dissolve in the aqueous solution upon submersion.

20. The composition of claim 19, wherein the water-resistant modifier is present in the composition at a total weight percent of less than 1% (w/w).

* * * * *